(12) United States Patent
Kim (10) Patent No.: US 12,012,721 B2
(45) Date of Patent: Jun. 18, 2024

(54) COUPLING STRUCTURE OF CONSTRUCTION MACHINE

(71) Applicant: HD HYUNDAI INFRACORE CO., LTD., Incheon (KR)

(72) Inventor: Jinuk Kim, Incheon (KR)

(73) Assignee: HD HYUNDAI INFRACORE CO., LTD., Incheon (KR)

(*) Notice: Subject to any disclaimer, the term of this patent is extended or adjusted under 35 U.S.C. 154(b) by 243 days.

(21) Appl. No.: 17/567,545

(22) Filed: Jan. 3, 2022

(65) Prior Publication Data

US 2022/0205218 A1  Jun. 30, 2022

(30) Foreign Application Priority Data

Dec. 31, 2020 (KR) .................. 10-2020-0189108

(51) Int. Cl.
*E02F 9/08* (2006.01)
*B62D 25/12* (2006.01)

(52) U.S. Cl.
CPC ............ *E02F 9/0891* (2013.01); *B62D 25/12* (2013.01)

(58) Field of Classification Search
CPC ................................ E02F 9/0891; B62D 25/12
See application file for complete search history.

(56) References Cited

U.S. PATENT DOCUMENTS

| | | | | |
|---|---|---|---|---|
| 3,790,183 A | * | 2/1974 | Price | ............... B66F 9/07518 414/466 |
| 2019/0308859 A1 | | 10/2019 | Yoshioka et al. | |
| 2022/0205218 A1 | * | 6/2022 | Kim | ............... B62D 25/12 |

FOREIGN PATENT DOCUMENTS

| | | | | |
|---|---|---|---|---|
| CN | 203283299 U | | 11/2013 | |
| CN | 210031956 U | | 2/2020 | |
| CN | 218508539 U | * | 2/2023 | |
| JP | H0657956 U | * | 8/1994 | |
| JP | H0657962 U | * | 8/1994 | |
| JP | 2002-188176 A | | 7/2002 | |
| JP | 2005090094 A | * | 4/2005 | ............ E02F 9/0866 |
| JP | 2006-37466 A | | 2/2006 | |
| JP | 2012-144204 A | | 8/2012 | |

(Continued)

OTHER PUBLICATIONS

Office Action dated Sep. 22, 2022, for corresponding German patent application No. 10 2021 215 127.2 (14 pages).

(Continued)

*Primary Examiner* — Jacob B Meyer
(74) *Attorney, Agent, or Firm* — Hauptman Ham, LLP (57) ABSTRACT

The present disclosure relates to a coupling structure of a construction machine having improved durability of a hinge and improved assembling properties by allowing an engine cover to be easily assembled to a main body regardless of an assembly order of a counterweight, the coupling structure having effects that since another side of a connection plate is positioned so as to be upwardly spaced apart from an upper portion of a counterweight by a height of a protruding support, vibration generated from the counterweight is not transmitted to another side of the connection plate, thereby improving durability of the hinge. In addition, since the connection plate is supported by the support, there is an effect that the engine cover may be easily coupled to the connection plate by using the hinge, regardless of the assembly order of the counterweight.

10 Claims, 9 Drawing Sheets

(56) References Cited

FOREIGN PATENT DOCUMENTS

| | | | |
|---|---|---|---|
| JP | 2016-102373 A | | 6/2016 |
| JP | 2016102373 A | * | 6/2016 |
| JP | 2020-114963 A | | 7/2020 |
| KR | 10-2015-0032540 A | | 3/2015 |
| KR | 20220010205 A | * | 1/2022 |

OTHER PUBLICATIONS

Office Action dated Jan. 4, 2023, for corresponding Chinese patent application No. 202111669519.5 (6 pages).

* cited by examiner

FIG. 1

Prior Art

FIG. 2

Prior Art

FIG. 3

Prior Art

FIG. 4

Prior Art

COUPLING STRUCTURE OF CONSTRUCTION MACHINE

CROSS-REFERENCE TO RELATED APPLICATION

This application claims priority under 35 U.S.C. § 119 to Korean Patent Application No. 10-2020-0189108, filed on Dec. 31, 2020, in the Korean Intellectual Property Office (KIPO), the disclosure of which is incorporated by reference herein in its entirety.

TECHNICAL FIELD

The present disclosure relates to a coupling structure of a construction machine, and more particularly, to a coupling structure of a construction machine having improved durability of a hinge and improved assembling properties by allowing an engine cover to be easily assembled to a main body regardless of an assembly order of a counterweight.

DISCUSSION OF RELATED ART

In general, construction machine is a mechanical equipment designed to perform various tasks in construction works, for example, mainly in civil engineering, such as excavation, transport, drilling, and paving. Such a construction machine may include an excavator, a loader, a forklift, and the like. As a configuration of such a construction machine, it includes a traveling body, a main body (e.g., vehicle body) positioned on the top of the traveling body and including an engine, a work device mounted at the front of the main body to perform works, and a cabin installed on the top of the main body and in which the driver rides. In addition, a counterweight having a certain weight is provided at the rear of the main body, so that an external force of the work device acting on the main body and a load of the counterweight are balanced with each other.

Figure 1:
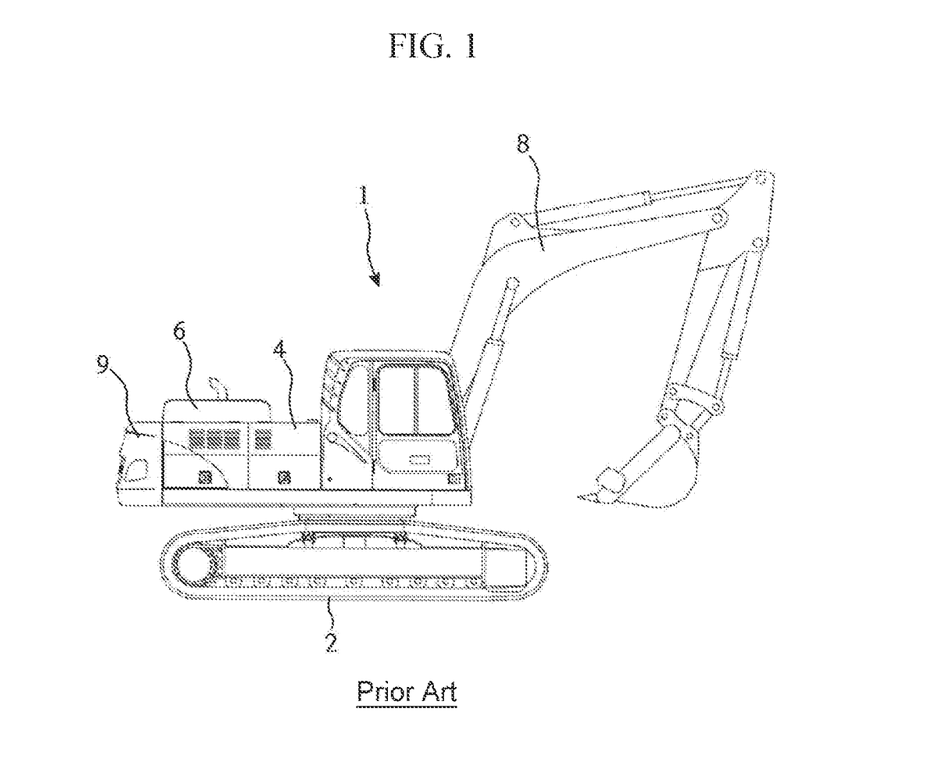
FIG. 1 is a view schematically illustrating a conventional construction machine.
Figure 2:
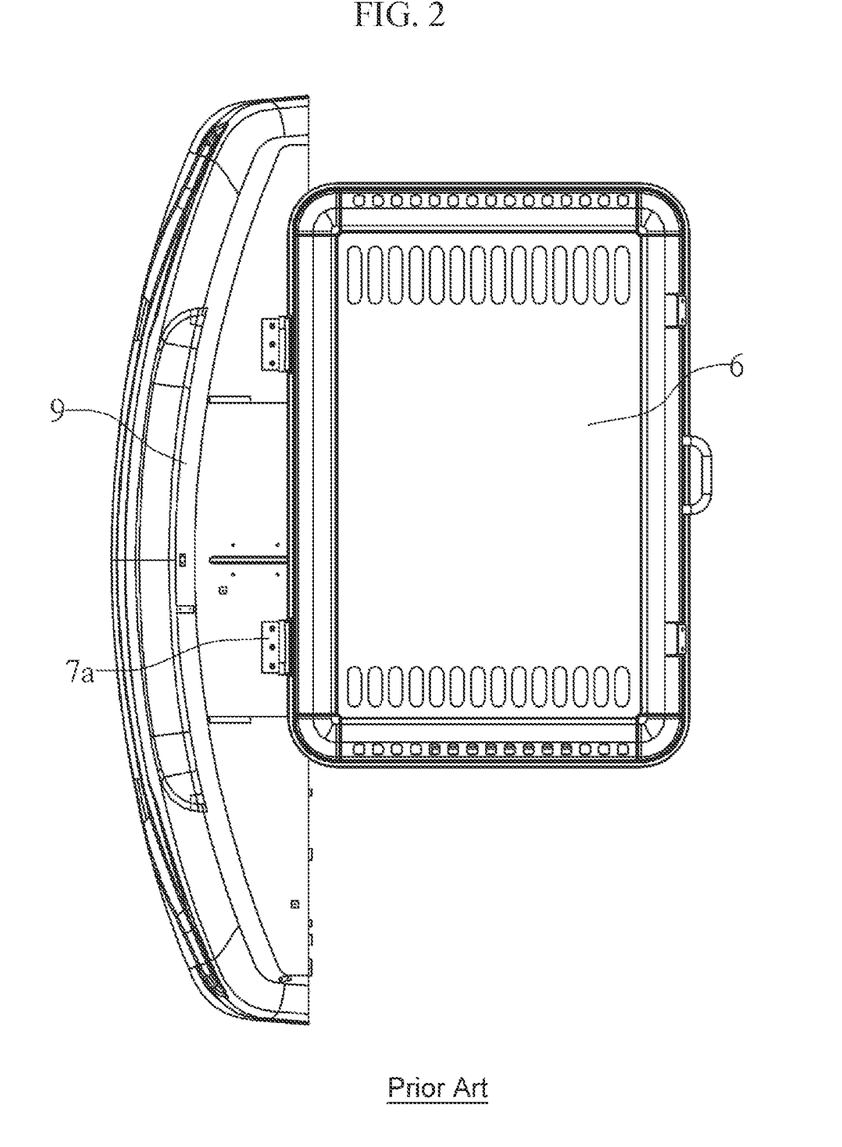
FIG. 2 is a view illustrating a counterweight mounted at the rear of a main body and an engine cover for covering an upper portion of the main body in the conventional construction machine.
Figure 3:
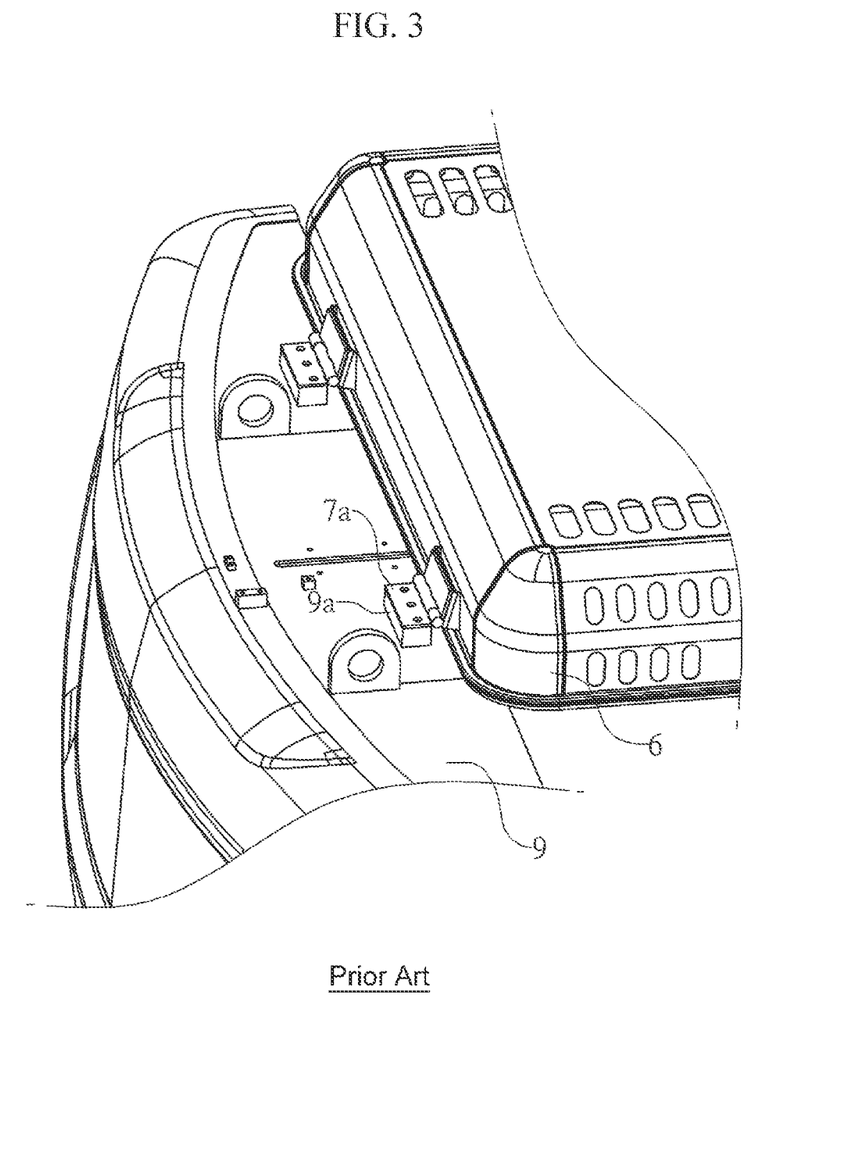
FIG. 3 is a view illustrating a hinge connecting the counterweight and the engine cover in the conventional construction machine.
Figure 4:
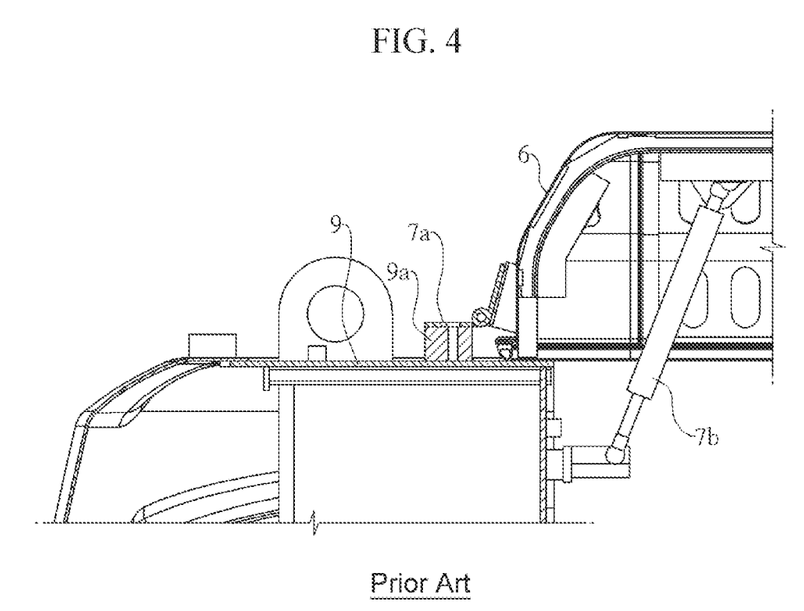
FIG. 4 is a view illustrating a state in which the hinge connecting the counterweight and the engine cover of the conventional construction machine is supported by a support.

FIG. 1 is a view schematically illustrating a conventional construction machine, FIG. 2 is a view illustrating a counterweight mounted at the rear of a main body and an engine cover for covering an upper portion of the main body in the conventional construction machine, FIG. 3 is a view illustrating a hinge connecting the counterweight and the engine cover in the conventional construction machine, and FIG. 4 is a view illustrating a state in which the hinge connecting the counterweight and the engine cover of the conventional construction machine is supported by a support.

Referring to FIGS. 1 to 4, in a conventional construction machine 1, a main body 4 including an engine is positioned on a traveling body 2, and an engine cover 6 for covering the engine is provided on the main body 4. In addition, a work device 8 is provided at the front of the main body 4, and a counterweight 9 is provided at the rear of the main body 4.

As an assembly structure between the engine cover 6 and the counterweight 9 of the conventional construction machine 1, a hinge 7a of the engine cover 6 is coupled to a support 9a protruding from an upper portion of the counterweight 9, and a gas cylinder 7b is mounted inside the engine cover 6. The gas cylinder 7b includes one side and another side coupled to a side of the counterweight 9 and an inner upper portion of the engine cover 6, respectively.

However, since the hinge 7a of the engine cover 6 is coupled to the support 9a as described above, in order to assemble the engine cover 6, the assembly of the counterweight 9 should be preceded, leading to a problem that an assembly process of the engine cover 6 may be limited. In addition, since the support 9a of the counterweight 9 is connected to a lower portion of the hinge 7a, vibration generated in the counterweight 9 is transmitted to the engine cover 6 through the support 9a and the hinge 7a, and this vibration of the engine cover 6 applies a significant impact to the vicinity of the hinge 7a, leading to a problem that malfunction of the hinge 7a may occur frequently.

PRIOR ART LITERATURE

Patent Literature

Korean Patent Publication No. 10-2015-0032540

SUMMARY

Embodiments of the present disclosure may be directed to a coupling structure of a construction machine having improved durability of a hinge and improved assembling properties by allowing an engine cover to be easily assembled to a main body regardless of an assembly order of a counterweight.

Embodiments of the present disclosure may be further directed to a coupling structure of a construction machine that reinforces a strength of a hinge coupled to an engine cover.

According to an embodiment, in a coupling structure of a construction machine, the construction machine includes a counterweight positioned to face a main body and an engine cover covering an upper portion of the main body, and the coupling structure includes: a connection plate including one side supported by the main body and another side extending upwardly of the counterweight; and a hinge including one side mounted on another side of the connection plate and another side mounted on the engine cover to guide rotation of the engine cover, wherein another side of the connection plate and an upper side of the counterweight are positioned to be spaced apart from each other.

In some embodiment, the counterweight may include a sidewall facing the main body, and an upper portion formed at an upper end of the sidewall in an opposite direction to the main body, the coupling structure may further include a support supported by the main body and positioned above the sidewall facing the main body, and one side of the connection plate may be supported by the support and another side of the connection plate extends to face the upper portion.

In some embodiment, the coupling structure of the construction machine may further include a protruding support protruding above the support and including an upper end positioned above the upper portion, wherein one side of the connection plate is supported by the protruding support.

In some embodiment, the connection plate may be formed in a plate shape, and one side of the connection plate in a longitudinal direction may be connected to the protruding support and another side of the connection plate in the longitudinal direction may extend in a cantilever shape to face the upper portion.

In some embodiment, the support may include: a first support elongated along a longitudinal direction and is positioned above the sidewall; and a second support bent from an upper portion of the first support in a direction away from the sidewall.

In some embodiment, the protruding support may be configured as a pair so as to be spaced apart from each other at opposite sides of the second support in a longitudinal direction of the second support.

In some embodiment, the first support may be upwardly spaced apart from the sidewall, and the coupling structure may further include a support bar including one side supporting a lower portion of the second support and another side elongated to be supported by a lower portion of the main body.

In some embodiment, the engine cover may include a cover plate for covering an upper portion of the main body, and a rim portion extending downward along a rim of the cover plate, the hinge may include a first hinge coupled to the connection plate, and a second hinge including one side rotatably coupled to the first hinge and another side coupled to an outer side of the rim portion, a reinforcement portion may be provided at an inner side of the rim portion positioned in an opposite direction to the second hinge, and a gas cylinder may be provided between the support and the cover plate, and the engine cover is rotated by operation of the gas cylinder.

In some embodiment, the reinforcement portion may include a reinforcement plate spaced apart from an inner side of the rim portion and elongated along an inner longitudinal direction of the rim portion; and a reinforcement bent portion bent at opposite sides of the reinforcement plate in a longitudinal direction to be coupled to the inner side of the rim portion in a unitary structure.

According to an embodiment, a coupling structure of a construction machine includes: a counterweight positioned to face a main body of the construction machine; an engine mounted on the main body; an engine cover for covering the engine; a connection plate including one side supported by the mainbody and another side extending upwardly of the counterweight; a protruding support coupled between the main body and the connection plate; and a hinge including one side mounted on another side of the connection plate and another side mounted on the engine cover to guide rotation of the engine cover, wherein another side of the connection plate and an upper portion of the counterweight are positioned to be spaced apart from each other according to a height of the protruding support.

DETAILED DESCRIPTION

Hereinafter, a coupling structure of a construction machine according to a preferred embodiment of the present disclosure will be described in more detail with reference to the accompanying drawings.

Figure 5:
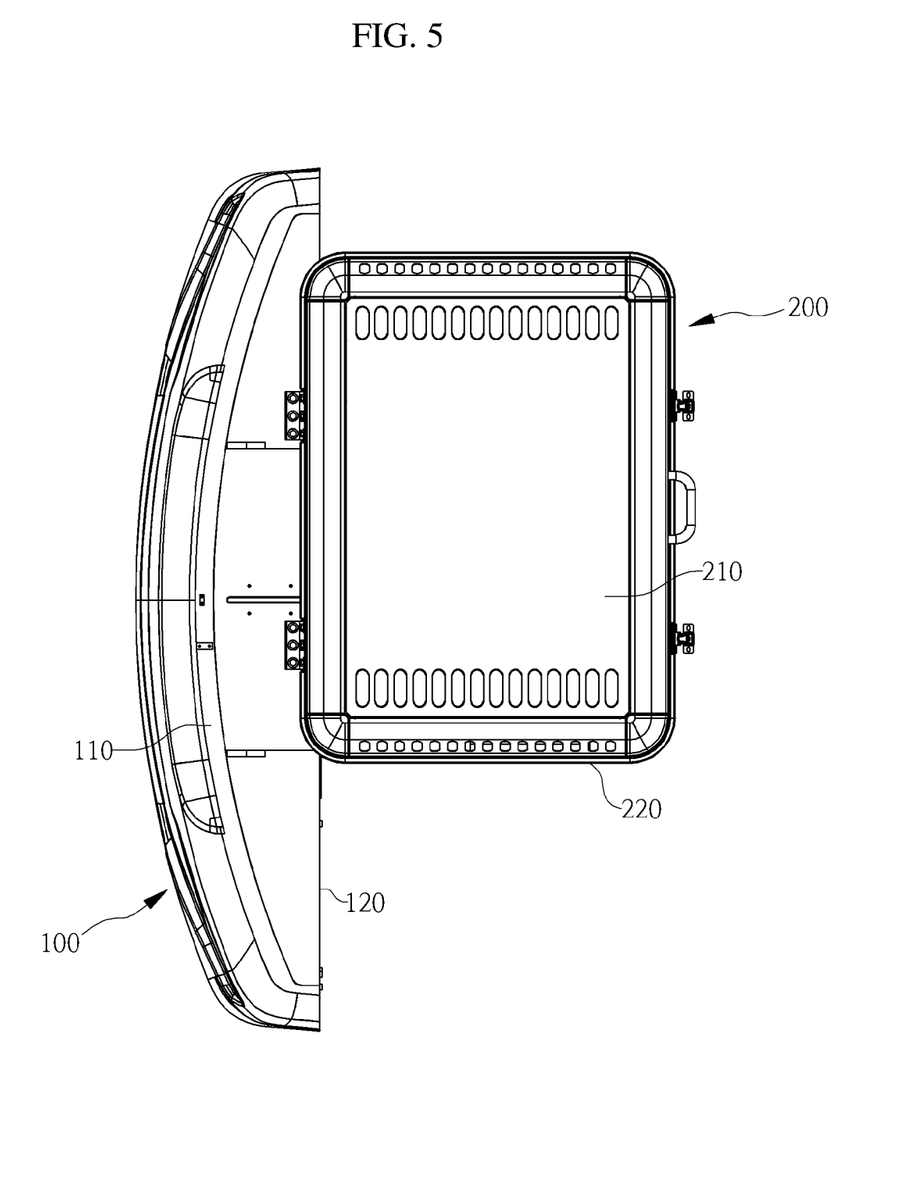
FIG. 5 is a view schematically illustrating a coupling structure of a construction machine according to a preferred embodiment of the present disclosure.
Figure 6:
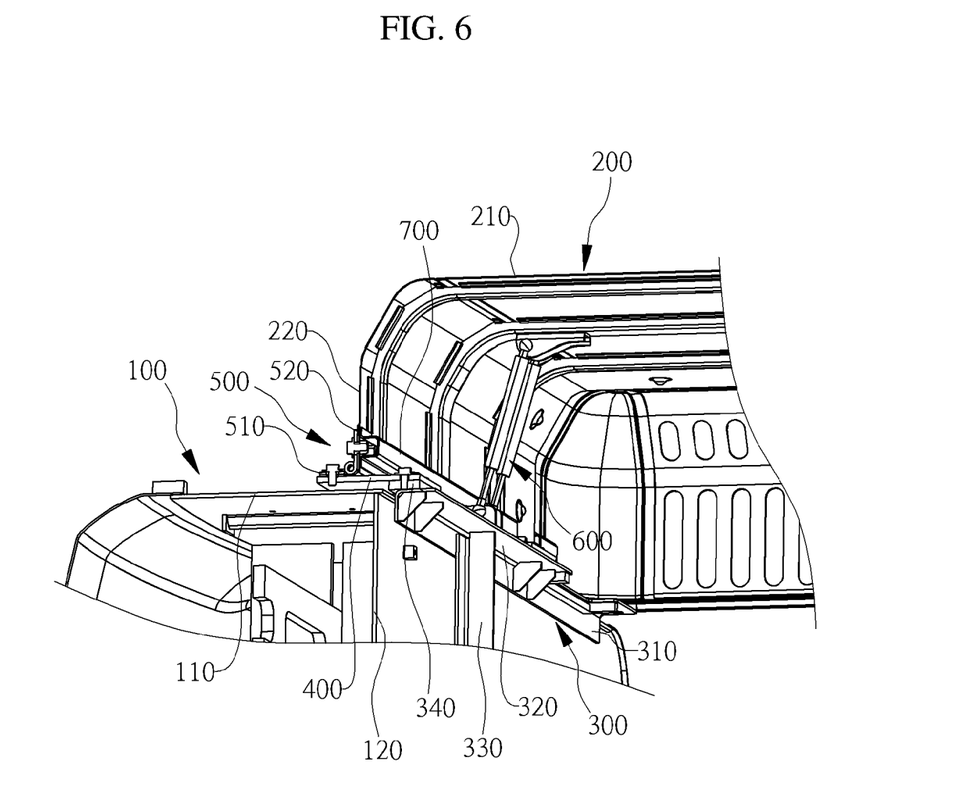
FIG. 6 is a view schematically illustrating a support and a connection plate of the coupling structure of the construction machine according to a preferred embodiment of the present disclosure.
Figure 7:
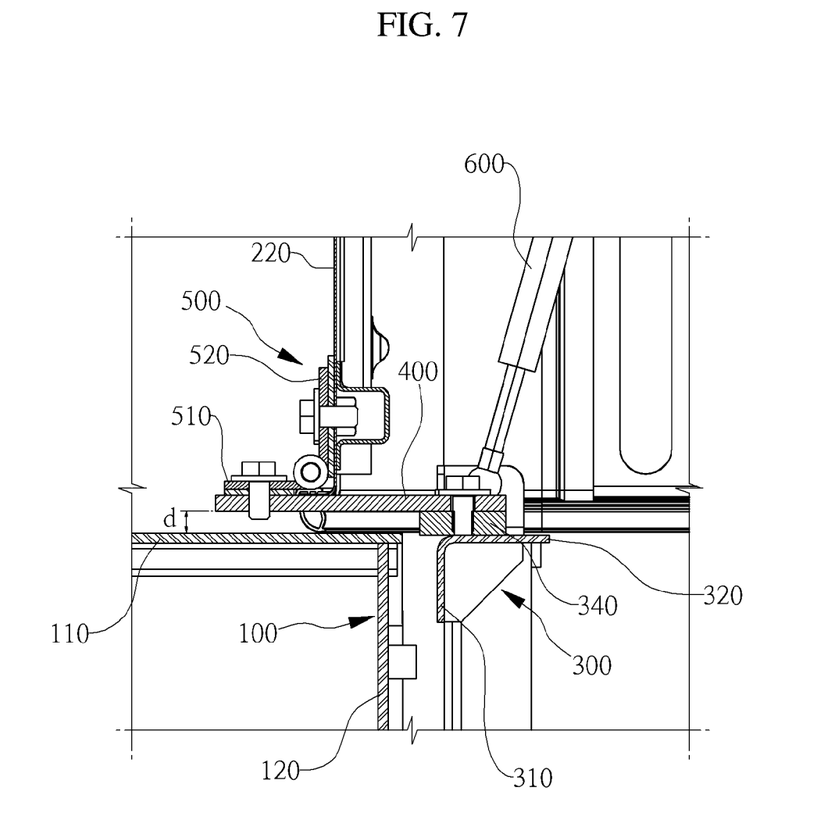
FIG. 7 is a view schematically illustrating a state in which the connection plate of the coupling structure of the construction machine is upwardly spaced apart from an upper portion according to a preferred embodiment of the present disclosure.

FIG. 5 is a view schematically illustrating a coupling structure of a construction machine according to a preferred embodiment of the present disclosure, FIG. 6 is a view schematically illustrating a support and a connection plate of the coupling structure of the construction machine according to a preferred embodiment of the present disclosure, and FIG. 7 is a view schematically illustrating a state in which the connection plate of the coupling structure of the construction machine is upwardly spaced apart from an upper portion according to a preferred embodiment of the present disclosure.

Referring to FIGS. 5 to 7, a coupling structure of a construction machine according to a preferred embodiment of the present disclosure is configured to couple a counterweight 100 and an engine cover 200 of the construction machine. The coupling structure of the construction machine may include a support 300, a connection plate 400, a hinge 500, and a gas cylinder 600, and may further include a reinforcement portion 700. The counterweight 100 includes a sidewall 120 facing a main body (not illustrated) in which an engine is positioned, and an upper portion 110 formed at an upper end of the sidewall 120 in a direction opposite to the main body. The engine cover 200 is configured to cover an upper portion of the main body and includes a cover plate 210 for covering the upper portion of the main body, and a rim portion 220 extending downward along a rim of the cover plate 210.

The support 300 is positioned above (or on) one surface of the sidewall 120 facing the main body and supports the connection plate 400 to be described below. The support 300 may include a first support 310 and a second support 320, and may further include a support bar 330 and a protruding support 340. The first support 310 is elongated along a longitudinal direction and is positioned above (or on) the sidewall 120. The second support 320 is formed to be bent from an upper portion of the first support 310 in a direction away from the sidewall 120. In such an embodiment, the first support 310 may be in close contact with the upper portion of the sidewall 120 or may be positioned to be spaced apart from the upper portion of the sidewall 120. When the first support 310 is spaced apart from the upper portion of the sidewall 120, the second support 320 may be supported by the support bar 330 to be described below. The support bar 330 is elongated to be erected in a vertical direction, and includes an upper portion supporting a lower portion of the second support 320 and a lower portion extending to be supported by a lower portion of the main body. The protruding support 340 is configured as a pair so as to be spaced apart from each other at opposite sides of the second support 320 in a longitudinal direction of the second support 320 and is formed to protrude above (e.g., from) the second support 320, and an upper end of the protruding support 340 may be positioned higher than the upper portion 110. In an embodiment, the protruding support 340 may be coupled (disposed) between the main body and the connection plate 400.

The connection plate 400 is provided in the form of a plate-shaped bar, including one side supported by the protruding support 340 and another side extending in a cantilever shape to face the upper portion 110, and another side of the connection plate 400 is upwardly spaced apart from the upper portion 110 by a predetermined distance d. As such, since another side of the connection plate 400 is positioned to be upwardly spaced apart from the upper portion 110 of the counterweight 100 by a height of the protruding support 340, there is an effect that vibration generated in the counterweight 100 is not transmitted to another side of the connection plate 400. In other words, another side of the connection plate 400 and the upper side of the counterweight 100 may be positioned to be spaced apart from each other according to the height of the protruding support 340.

The hinge 500 is configured to guide rotation of the engine cover 200 and includes a first hinge 510 coupled to another side of the connection plate 400, and a second hinge 520 including one side rotatably connected to the first hinge 510 and another side coupled to an outer side of the rim portion 220. As such, since the first hinge 510 is coupled to another side of the connection plate 400, and another side of the connection plate 400 is upwardly spaced apart from the upper portion of the counterweight 100, the vibration generated in the counterweight 100 is not transmitted to the first hinge 510, and there is an effect that durability of the hinge 500 is improved. In addition, since the connection plate 400 is supported by the support 300, the engine cover 200 may be easily coupled to the connection plate 400 using the hinge 500, regardless of an assembly order of the counterweight 100.

In an embodiment, the gas cylinder 600 is provided between the support bar 330 of the support 300 and the cover plate 210, and the engine cover 200 is configured to rotate by the operation of the gas cylinder 600 in a state that the engine cover 200 is supported by the hinge 200. In such an embodiment, since high stress is generated in vicinity of a portion of the engine cover 200 connected to the hinge 500, there is a risk that a shape of the engine cover 200 may be deformed. In order to solve this problem, in the present disclosure, a reinforcement portion 700 is provided in the engine cover 200.

Figure 8:
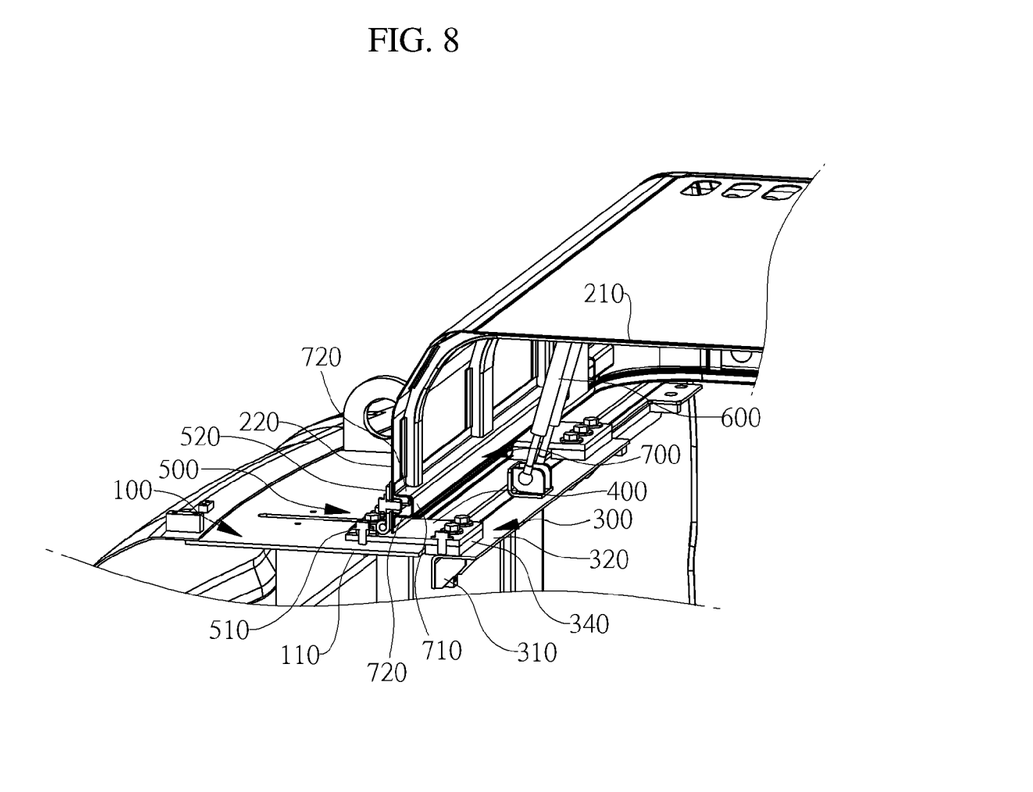
FIG. 8 is a view schematically illustrating a state in which a reinforcement portion is provided on the engine cover of the coupling structure of the construction machine according to a preferred embodiment of the present disclosure.
Figure 9:
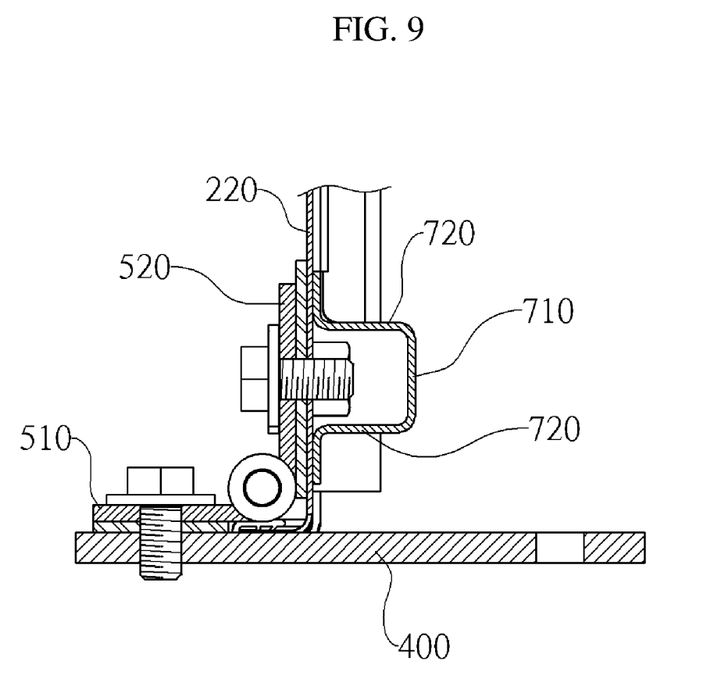
FIG. 9 is a view schematically illustrating the reinforcement portion of the coupling structure of the construction machine according to a preferred embodiment of the present disclosure.

FIG. 8 is a view schematically illustrating a state in which a reinforcement portion is provided on the engine cover of the coupling structure of the construction machine according to a preferred embodiment of the present disclosure, and FIG. 9 is a view schematically illustrating the reinforcement portion of the coupling structure of the construction machine according to a preferred embodiment of the present disclosure.

Referring to FIGS. 8 and 9, the reinforcement portion 700 is provided at an inner side of the rim portion 220 of the engine cover 200 positioned in an opposite direction to the second hinge 520 and is configured to reinforce strength of the rim portion 220. This reinforcement portion 700 is elongated in a longitudinal direction, and its cross-section is bent in a 'C' shape. As a detailed configuration, the reinforcement portion 700 includes a reinforcement plate 710 spaced apart from an inner side of the rim portion 220 and elongated along an inner longitudinal direction of the rim portion 220, and a reinforcement bent portion 720 that is bent at opposite sides of the reinforcement plate 710 in a longitudinal direction to be coupled to an inner side of the rim portion 220 in a unitary structure.

As the reinforcement portion 700 includes the reinforcement bent portion 720 bent at opposite sides of the reinforcement plate 710 in an inward direction of the rim portion 220, thus reinforcing an inner strength of the rim portion 220, there is an effect that a strength of the rim portion 220 of the engine cover 200 connected to the hinge 500 may be improved.

As set forth hereinabove, according to one or more embodiments of the present disclosure, since another side of the connection plate is positioned so as to be upwardly spaced apart from an upper portion of the counterweight by a height of the protruding support, vibration generated from the counterweight is not transmitted to another side of the connection plate, thereby improving durability of the hinge.

In addition, since the connection plate is supported by the support, there is an effect that the engine cover may be easily coupled to the connection plate by using the hinge, regardless of the assembly order of the counterweight.

In addition, since the reinforcement portion includes the reinforcement bent portion which is bent at opposite sides of the reinforcement plate in an inward direction of the rim portion, it is possible to reinforce the inner strength of the rim portion, thereby improving the strength of the rim portion of the engine cover connected to the hinge.

Although the present disclosure has been described in detail with the above embodiments, the present disclosure is not limited thereto, and it is apparent to those skilled in the art that various changes and modifications may be made within the scope of the technical spirit of the present disclosure, and if these variations and modifications are within the scope of the claims, the technical idea should also be regarded as belonging to the present disclosure.

What is claimed is:

1. A coupling structure of a construction machine, the construction machine comprising a counterweight positioned to face a main body and an engine cover covering an upper portion of the main body, the coupling structure comprising:
    a connection plate comprising a first side supported by the main body and a second side extending upwardly of the counterweight; and
    a hinge comprising a first portion mounted on the second side of the connection plate and a second portion mounted on the engine cover to guide rotation of the engine cover,
    wherein the second side of the connection plate and an upper side of the counterweight are positioned to be spaced apart from each other.

2. The coupling structure of the construction machine of claim 1, wherein the counterweight comprises a sidewall facing the main body, and an upper portion of the counterweight formed at an upper end of the sidewall in an opposite direction to the main body,
    the coupling structure further comprises a support supported by the main body and positioned above the sidewall facing the main body, and
    the first side of the connection plate is supported by the support and the second side of the connection plate extends to face the upper portion of the counterweight.

3. The coupling structure of the construction machine of claim 2, further comprising a protruding support protruding above the support and including an upper end of the protruding support positioned above the upper portion of the counterweight, wherein the first side of the connection plate is supported by the protruding support.

4. The coupling structure of the construction machine of claim 3, wherein the connection plate is formed in a plate shape, and
the first side of the connection plate in a longitudinal direction is connected to the protruding support and the second side of the connection plate in the longitudinal direction extends in a cantilever shape to face the upper portion of the counterweight.

5. The coupling structure of the construction machine of claim 3, wherein the support comprises:
a first support elongated along a longitudinal direction and is positioned above the sidewall; and
a second support bent from an upper portion of the first support in a direction away from the sidewall.

6. The coupling structure of the construction machine of claim 5, wherein the protruding support is configured as a pair so as to be spaced apart from each other at opposite sides of the second support in a longitudinal direction of the second support.

7. The coupling structure of the construction machine of claim 5, wherein the first support is upwardly spaced apart from the sidewall, and
the coupling structure further comprises a support bar including one side supporting a lower portion of the second support and another side elongated to be supported by a lower portion of the main body.

8. The coupling structure of the construction machine of claim 1, wherein the engine cover comprises a cover plate for covering the upper portion of the main body, and a rim portion extending downward along a rim of the cover plate,
the hinge comprises a first hinge coupled to the connection plate, and a second hinge comprising one side rotatably coupled to the first hinge and another side coupled to an outer side of the rim portion,
a reinforcement portion is provided at an inner side of the rim portion positioned in an opposite direction to the second hinge, and
a gas cylinder is provided between the support and the cover plate, and the engine cover is rotated by operation of the gas cylinder.

9. The coupling structure of the construction machine of claim 8, wherein the reinforcement portion comprises:
a reinforcement plate spaced apart from an inner side of the rim portion and elongated along an inner longitudinal direction of the rim portion; and
a reinforcement bent portion bent at opposite sides of the reinforcement plate in a longitudinal direction to be coupled to the inner side of the rim portion in a unitary structure.

10. A coupling structure of a construction machine, comprising:
a counterweight positioned to face a main body of the construction machine;
an engine mounted on the main body;
an engine cover for covering the engine;
a connection plate comprising a first side supported by the main body and a second side extending upwardly of the counterweight;
a protruding support coupled between the main body and the connection plate; and
a hinge comprising a first portion mounted on the second side of the connection plate and a second portion mounted on the engine cover to guide rotation of the engine cover,
wherein the second side of the connection plate and an upper portion of the counterweight are positioned to be spaced apart from each other according to a height of the protruding support.

* * * * *